United States Patent [19]

Förster

[11] Patent Number: 4,727,908
[45] Date of Patent: Mar. 1, 1988

[54] FLEXIBLE TUBE OR HOSE OF RECTANGULAR CROSS-SECTION, PARTICULARLY ENERGY SUPPLY CONDUITS

[75] Inventor: Walter Förster, Stein, Fed. Rep. of Germany

[73] Assignee: Witzenmann GmbH Metallschlauch-Fabrik Pforzheim, Pforzheim, Fed. Rep. of Germany

[21] Appl. No.: 856,946

[22] Filed: Apr. 28, 1986

[51] Int. Cl.⁴ .............................................. F16L 11/18
[52] U.S. Cl. .................................... 138/120; 138/118; 191/12 C; 285/163
[58] Field of Search ............... 138/118, 120, 155, 178; 59/78.1; 191/12 R, 12 C; 285/163, 164; 174/68 C

[56] References Cited

U.S. PATENT DOCUMENTS

| 2,748,804 | 6/1956 | Guarnaschelli . | |
|---|---|---|---|
| 3,311,133 | 3/1964 | Kinander . | |
| 3,957,084 | 5/1976 | Jung . | |
| 4,171,236 | 9/1978 | Moritz | 138/120 |
| 4,228,825 | 10/1980 | Moritz et al. | 138/120 |
| 4,384,594 | 5/1983 | Moritz | 138/120 |
| 4,392,344 | 7/1983 | Gordon | 138/120 X |

FOREIGN PATENT DOCUMENTS

| 1675330 | 7/1971 | Fed. Rep. of Germany . |
|---|---|---|
| 2341849 | 3/1975 | Fed. Rep. of Germany . |
| 2622005 | 11/1977 | Fed. Rep. of Germany . |
| 2801330 | 7/1979 | Fed. Rep. of Germany . |
| 2853715 | 6/1980 | Fed. Rep. of Germany . |
| 2919379 | 11/1980 | Fed. Rep. of Germany . |
| 03005706 | 8/1981 | Fed. Rep. of Germany . |
| 3139737 | 4/1983 | Fed. Rep. of Germany . |
| 639739 | 11/1983 | Switzerland . |
| 990210 | 4/1965 | United Kingdom . |

OTHER PUBLICATIONS

Advertisement publication "ekd gelenkrohr", inclusive of translation and extract of a sworn statement relating to the publication date (1970).

*Primary Examiner*—James E. Bryant, III
*Attorney, Agent, or Firm*—Frishauf, Holtz, Goodman & Woodward

[57] ABSTRACT

A flexible tube or hose, particularly to carry cables, tubes and the like between a fixed and a removable end position. The tube or hose is of rectangular cross-section, and has separate, ring-shaped links that intermesh at a joint or separating line by means of locking-and-closing elements, arranged to bend only in one direction. The tube links have the joint or separating line on the internal or external side of the bend. The axially parallel portions of the links are connected by interengagement, or by material engagement, e.g. soldering, welding or adhesion. At least every second locking-and-closing element is of such a width that, starting from extended or buckled position of the tube, it blocks the mutual movement of neighboring or adjoining tube links.

15 Claims, 16 Drawing Figures

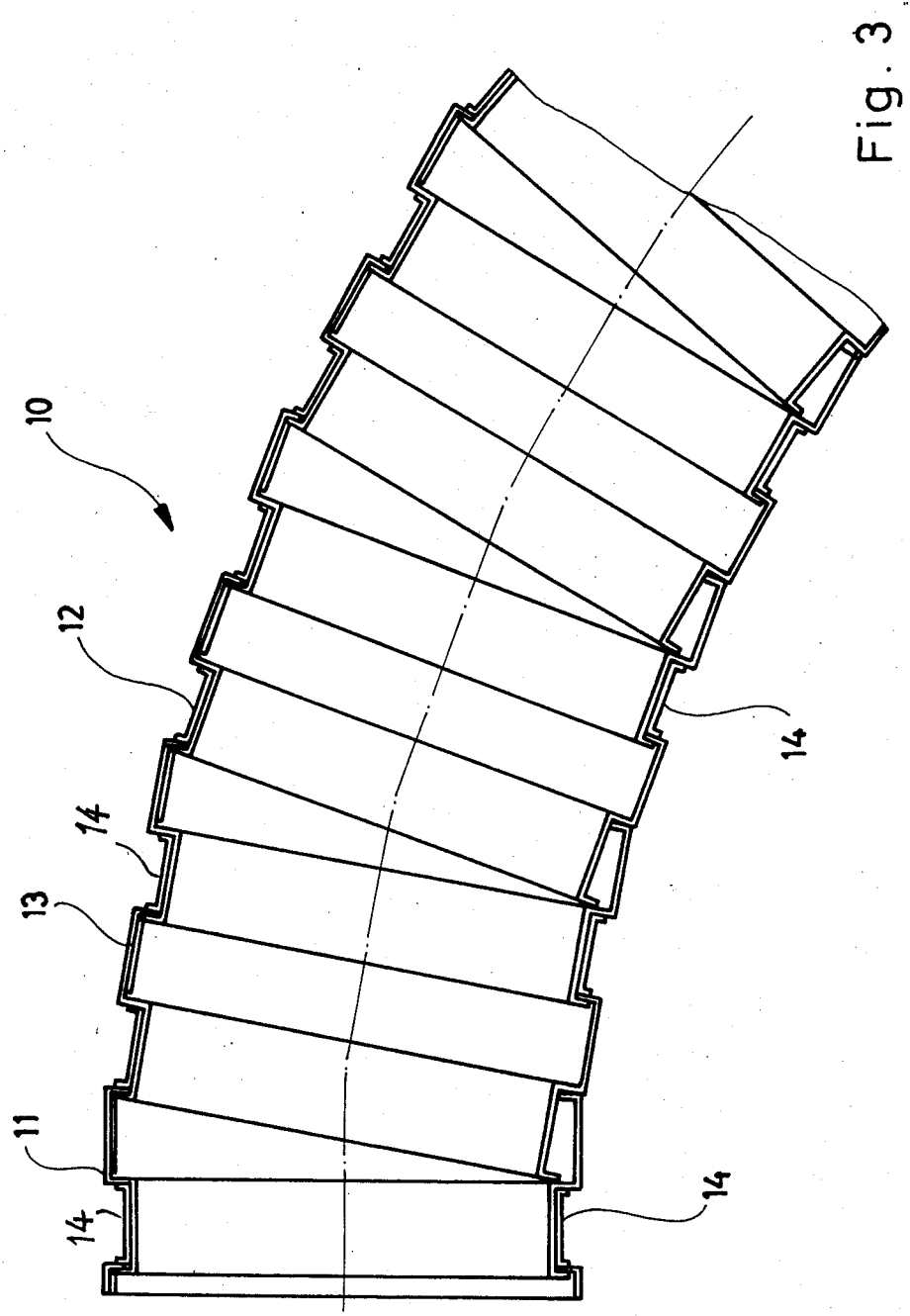

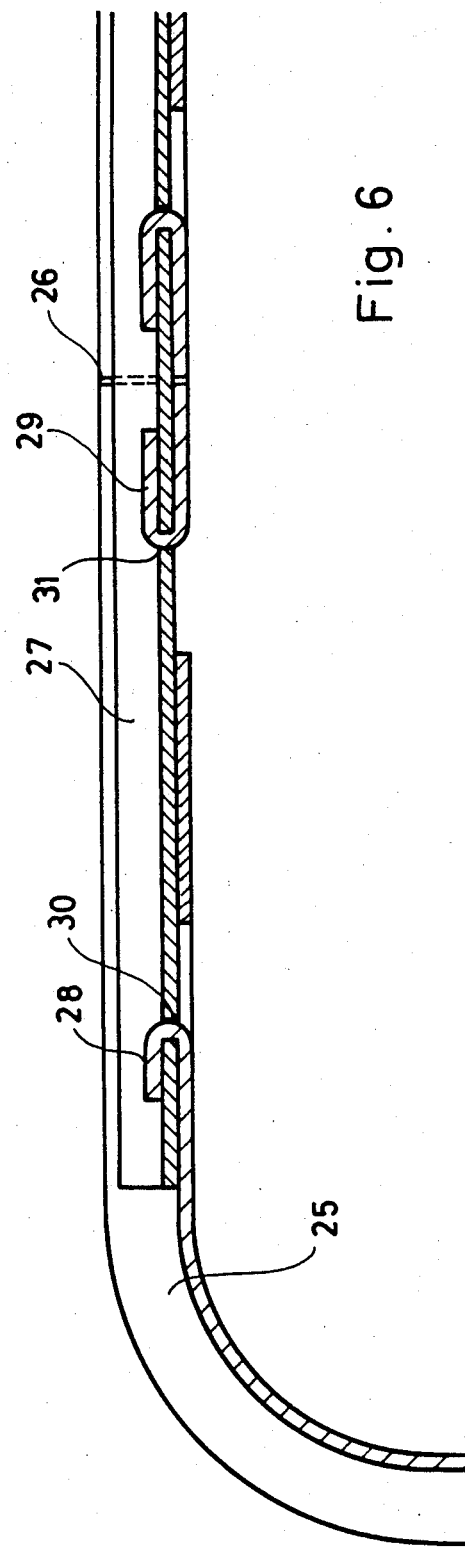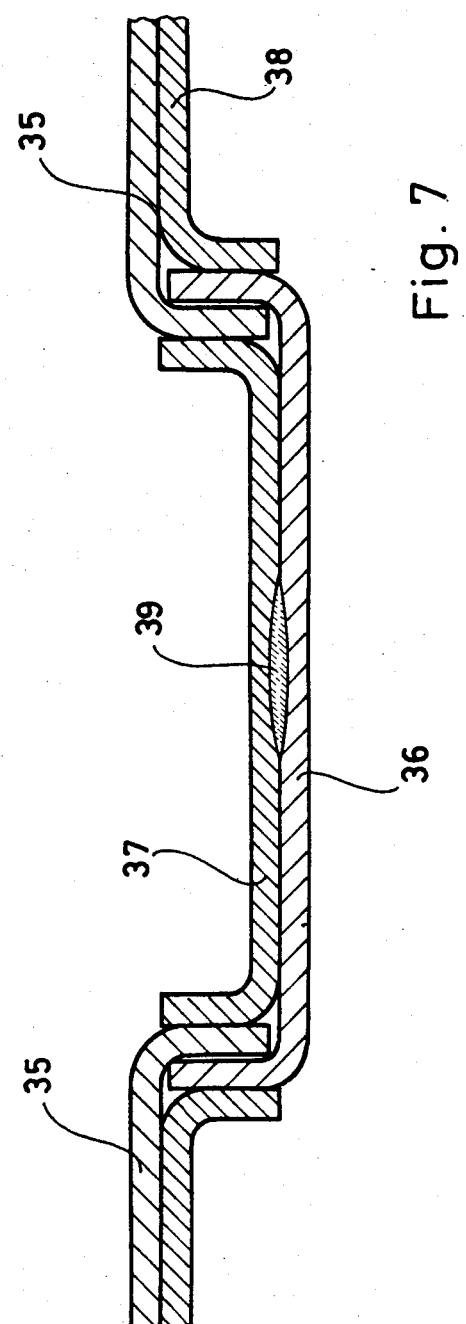

FLEXIBLE TUBE OR HOSE OF RECTANGULAR CROSS-SECTION, PARTICULARLY ENERGY SUPPLY CONDUITS

The invention relates to a flexible tube or hose of rectangular cross-section, particularly to carry cables, tubes and the like, for placement between a fixed terminal end and a movable second terminal end. The tube has separate, ring-shaped links whose radial section is S-shaped or U-shaped. The links are formed in such a way that adjoining links intermesh or interengage by their marginal, radial ridges or ribs. The links are attached or interlocked at each joint or separating line by locking-and-closure elements. The tube is so constructed that it can bend from a straight-line position only into a direction perpendicular to one of the rectangular sides of the cross section of the tube. Such tubes can be made of metal or plastic.

BACKGROUND

Tubes or hoses are known which are used for example with machine tools where they may carry cables, hoses, etc. between the machine frame and the support, i.e. generally for leading supply lines to a movable consumer or terminal end via an uncoiling loop. In known energy supply support conduits, tubes or hoses, the individual tube links are continuously concatenated and thus interconnected, by which means a link-tube of any length can be formed. However, such tube links are of relatively complex shapes, so that they must be manufactured of sheet metal with special stamping tools or of plastic with special moulding devices, which results in very high manufacturing costs. This is of special concern, since such tubes must be stocked in different cross-sectional sizes for a variety of applications, and since variable requirements exist regarding the possible bending radius of the said loop. That is why the supply of known tubes is limited to the most common dimensions, while the demand for less common dimensions can only be met approximately, which brings disadvantages that must be accepted.

Rectangular tubes wound from metal strips are commonly used, for example as energy supply conduits. It is known to constrain bending in one direction only by spacers inserted into the section externally on the bend, thus blocking movement in the other direction. However, these bent tubes have the disadvantage that in extended position they are twisted about their longitudinal axis; the twist is not only detrimental to their outward appearance, but that it also results in the tube being unable to stay straight on its intended path or in a track, thus limiting the length at which it can be used. Furthermore, the said characteristics result in an uneven load while the tube is bent, and this leads to uneven wear. For winding such tubes, only narrow strips can be used, and thus the surface dimensions are necessarily small, which means that the tube has a low lateral stiffness, and in relation to the number of radial ridges or ribs per tube length, the amount of material required is relatively large. Remnants cannot be utilized easily, since it is not economical to piece them together. Neither is it possible to repair a tube by inserting short pieces or tube elements. And finally, the manufacturing costs reflect the already mentioned disadvantages in view of different nominal tube widths and admissible winding radii. The winding radii can be influenced only by different configurations of the metal strips.

THE INVENTION

It is an object to design a support tube or hose in such a way that it can be simply made and repaired with strips of consistent width and configuration, using simple and inexpensive tools, in various nominal widths, with the possibility of realizing various admissible winding radii and using difficult materials without, however, incurring considerable additional costs.

Briefly, the flexible tube or hose has links which have a joint or separating line internally or externally with respect to the bending direction of the tube; the link parts containing the joints are connected with each other by means of locking-and-closing elements. At least every second such element is of such width that when the tube is extended or when it is buckled, it blocks the mutual movement of longitudinally neighboring links. The locking-and-closing elements can be made of metal or plastic.

In accordance with a feature of the invention, the joint or separating line of each tube link is designed to lie internally or externally on the bend. This provides the possibility of placing an external locking-and-closing element, or to insert a locking-and-closing element in the chamber formed by two adjoining links. Such elements will have, simultaneously, the function of bridging the joint and of blocking the movability of the tube sections on the internal or external side of the bend. This permits use of a minimum material and very simple handling while providing a simple and uncomplicated tube design.

The links according to the invention can be made of an appropriate configuration of consistent width by cutting them into separate sections from a suitably profiled or shaped or configured strip or rail. The elements are bent four times, thus achieving the precise internal and external guidance or support of the material strip in the bending tool over the entire circumference of the tube, so that even materials difficult to work, such as special steel, can be used. It is also possible to make parts of the bending tool adjustable, so that tubes of different nominal widths can be made without additional tools.

Because relatively wide strips can be used, a higher manufacturing speed and a smaller winding radius at a greater displacement travel can be achieved; in versions based on an extended tube position, less material is used per unit of length, since the number of radial ridges or ribs can be kept to a minimum. On the other hand, the height of the ridges and thus the lateral stiffness of the tube can be raised without jeopardizing the quality of the tube. Freedom of design therefore facilitates the simple and inexpensive construction of the tube which can be adapted to any requirements.

The connection between the link parts containing the joints and the locking-and-closing elements can be made positively by interlocking or with material engagement or joining, e.g. by screw or rivet connection, stamping, interlocking, etc., or by welding, soldering, adhesion, injection moulding or foaming. The connection may be separable, i.e. reversible, or permanent. A separable or reversible connection makes the replacement of faulty tube sections easier.

In the simplest case, the locking-and-closing elements can be designed as clips or straps inserted into the tube which form the connection and also block the movement of adjoining links. It is also possible to use locking-and-closing elements with a U-shaped radial configuration, to improve the lateral compressive strength of the tube. Solid locking-and-closing elements can be used which fill the entire tube section, not only in axial, but also in radial direction. With an extended tube position, one example for a design can consist of the locking-and-closing elements axially overlapping the internally open portion of the links through a projecting flap connected with the U-shaped section, beginning at a radially U-shaped configuration open toward the outside of the winding.

In all cases it can be desirable for the locking-and-closing elements to extend substantially over the entire rectangular side of the tube which contains the joint. This provides the exact guidance and support of adjoining tube links when under load.

A particular advantage in accordance with the invention is this: when additional locking elements are fastened to the tube link radially opposite to the individual locking-and-closing elements or when individual tube links go around the entire tube, the locking-and-closing elements block the mutual movability of the tube links externally as well as internally on the bend. This makes it possible, starting with a winding radius determined by the shape of the tube links, to design tubes with greater radii as the lower limit of the bending radius without having to alter anything else as far as the tube construction is concerned. This provides practically a continuous range of variation by, for example, forming every second, third or fourth locking-and-closing element to extend circumferentially around the tube, or arranging a locking element opposite each locking-and-closing element.

Tube links of U-shaped configuration can be so designed that the links lying radially inwardly are formed as self-contained links closed in themselves with a cross-section that is outwardly open. Such internal links are thus even simpler to make without the need for locking-and-closing elements, since to block the tube from bending in one direction, it is enough when each tube link contains one such locking element causing the blocking.

With tubes in buckled position, the locking-and-closing elements can be connected with at least the radially outwardly lying tube links. In this case it is not necessary for the locking-and-closing elements to be connected with the tube link that lies radially inwardly when the tube is buckled.

DRAWINGS

FIG. 3 shows a lateral section of a link-tube with enlarged bending radius;

FIGS. 4 to 15 show enlarged partial views of the tube with design details; and

DETAILED DESCRIPTION

Figure 2:
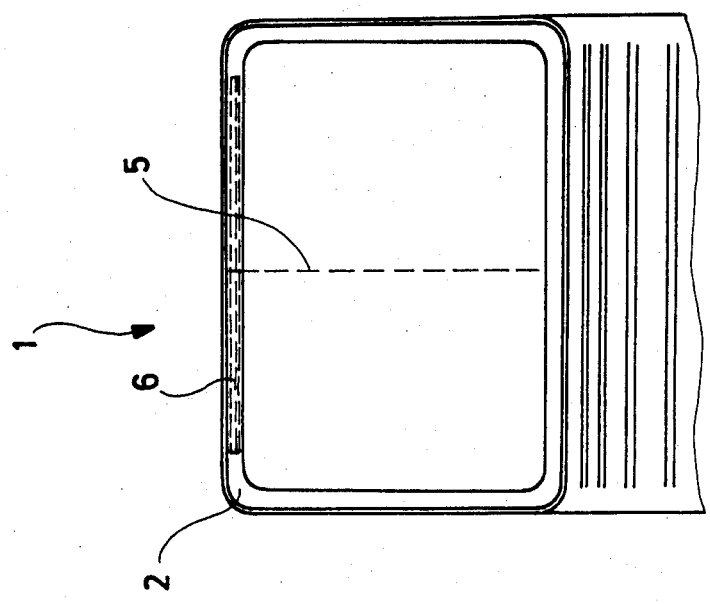
FIG. 2 shows a frong view of the tube according to FIG. 1.
Figure 1:
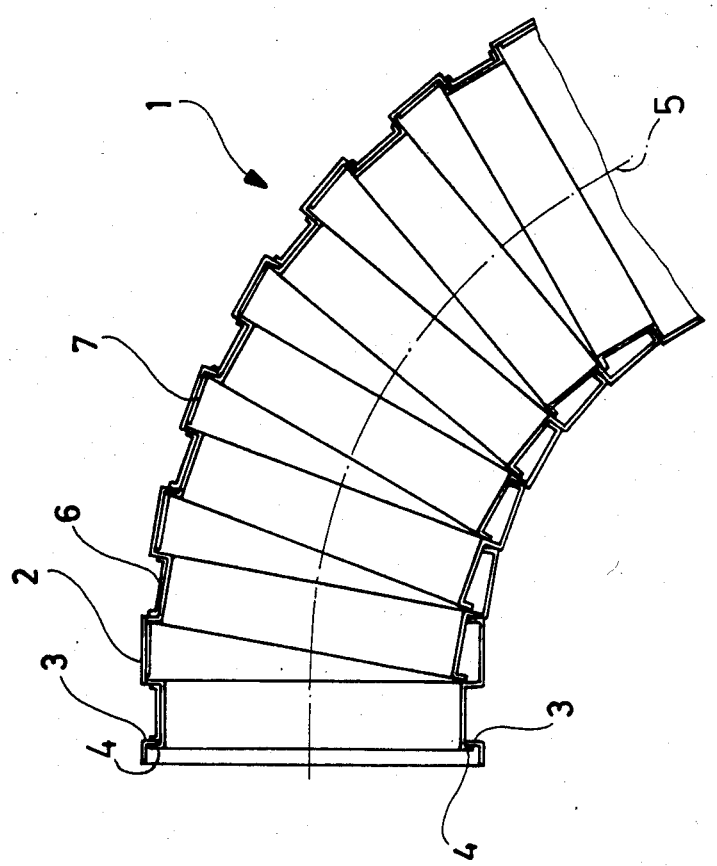
FIG. 1 shows a side view of a link-tube.

FIG. 1 shows a link-tube 1 in axial section, and FIG. 2 shows a view from the left—in relation to FIG. 1. This tube 1 has links 2 with S-shaped cross-section which are marginally concatenated in such a way that the radially inwardly protruding ridges or ribs 3 of one link mesh with the radially outwardly protruding ridges or ribs 4 of the adjoining link. As can be seen from FIG. 2, the tube 1 and hence the links 2 are rectangular in cross-section.

In accordance with a feature of the invention, the individual links have a joint or separating line 5 centrally at the outer side of the bend; to close the rings in that area, locking-and-closing elements 6, 7 are provided externally on the bend which are, as shown in FIG. 2, substantially of the same length and width as tube 1, while in longitudinal direction of the tube they insure that ridges or ribs 3 and 4 are held together.

Locking-and-closing elements 6 are of U-shaped cross-section, which increases the lateral compressional strength of the tube. The locking-and-closing elements 7 are simple straps. In both cases, the locking-and-closing elements are connected with those parts of tube-links 2 that adjoin joint 5 on both sides of joint 5; this connection can, for example, be a surface bond, e.g. made by soldering or adhesion; or a bond can be made by spot-welding or by forming interengaging fit-connections at several points.

As FIG. 1 shows, the adjoining tube links externally on the bend are always held at the mutual distance that is determined by the extended position of the tube. Internally of the bend of the tube the links can slide toward each other, which results in the flexibility or bendability of the tube in that direction.

Embodiment of FIG. 3: Tube 10, shown in side section, with section hatching omitted for clarity, has links 11 which are bent from a strip with an S-shaped cross-section. The cross section of tube 10 is the same as that shown in FIG. 2. The locking-and-closing elements 12 and 13 are also the same as those for FIGS. 1 and 2. However, in FIG. 3 individual locking elements 14, which otherwise correspond to locking-and-closing elements 12, are also provided located internally on the bend, so that they block the mutual movement of adjacent tube-links internally on the bend as well.

Thus, in comparison with FIG. 1, the tube according to FIG. 3 has a larger minimum bending radius without the necessity of any other design changes. Of course, links 12, 14 can also be designed as a complete ring, so that only one fastening point is required that may lie away from the joint.

As FIGS. 1–3 show, tube-links 2 or 11 are made from one piece by bending it four times. This determines the nominal width of the tube which, of course, can be altered without much difficulty by using an adjustable bending tool.

Figure 4:
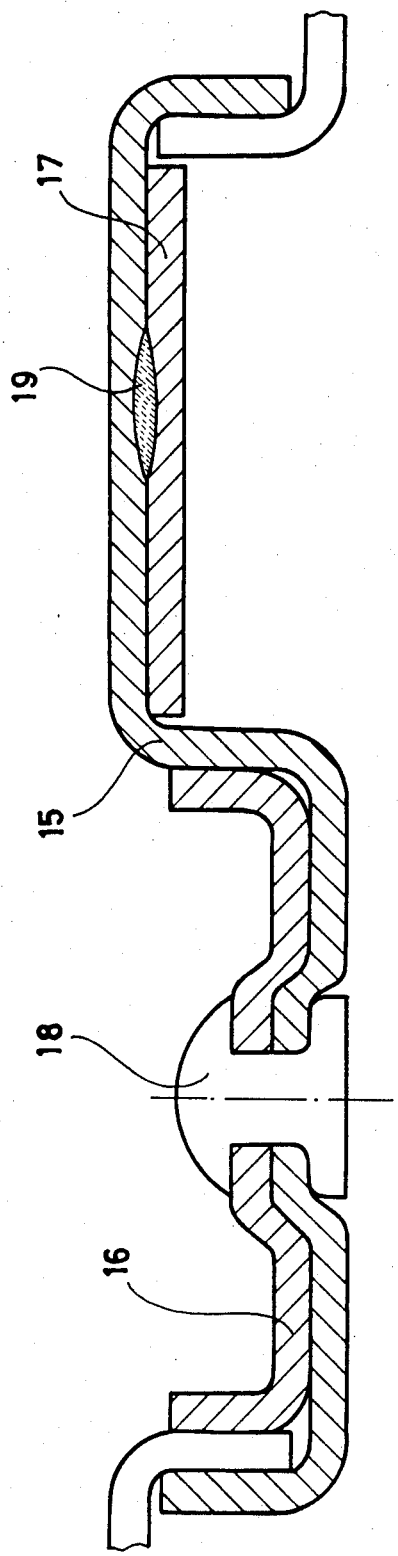

FIG. 4 shows an enlarged detail of the S-shaped cross-section 15 of a tube link with locking-and-closing elements 16 and 17. Locking-and-closing element 16 which has a U-shaped cross-section fits into that part of link 15 which is open toward the outside of the tube, while locking-and-closing element 17 fits into that part which is open toward the inside of the tube. As seen, locking-and-closing element 16 is connected with tube link 15 by means of several rivets 18, while element 17 is connected by spot weld 19.

Figure 5:
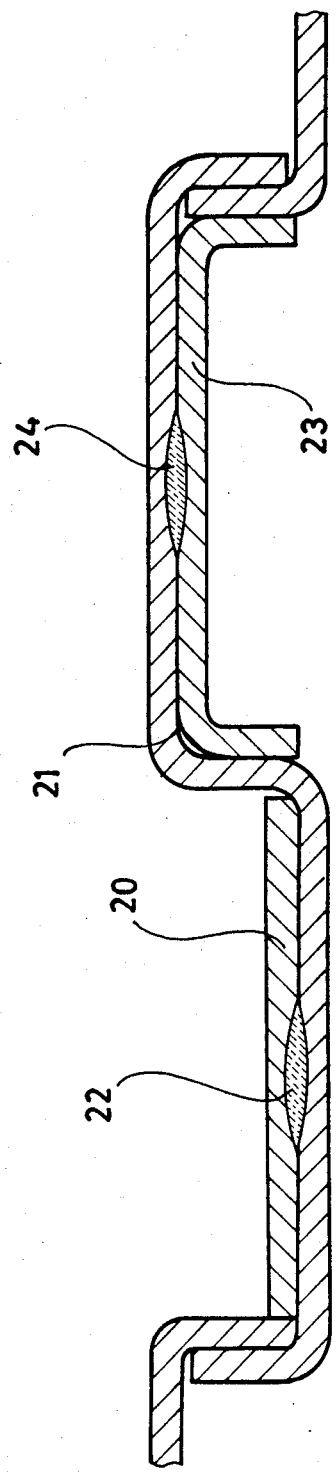

FIG. 5 shows an embodiment comparable to that in FIG. 4, but locking-and-closing element 20 is designed as a simple strap in that part of tube-link 21 which is open toward the outside of the tube, and fastened by weld 22, while locking-and-closing element 23 has a U-shaped radial cross-section, and is also fastened by welds 24.

FIG. 6 is an enlarged fragmentary section of a tube-link 25, shown similarly to FIG. 2. Here, separating line 5 is shown as joint 26 which is bridged by locking-and-closing element 27 of U-shaped radial cross-section. To form a positive engagement connection between tube link 25 and locking-and-closing element 27, tube-link 25 adjoining joint 26 has flaps 28, 29, stamped out, bent upwardly, pulled through openings 30, 31 of locking-and-closing element 27 and then bent onto said element.

FIG. 7 shows a link-tube composed of individual links 35, 36 with alternatingly opposite U-shaped configuration. The locking-and-closing elements 37, 38 are also formed with U-shaped cross-section and fastened to the tube links by means of welds 39.

Figure 8:
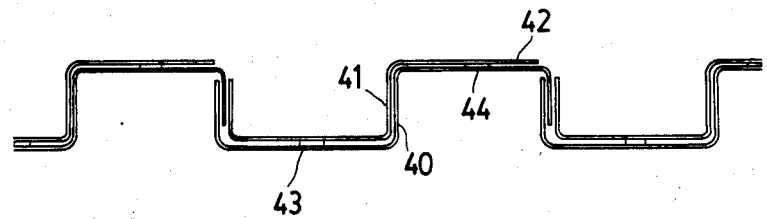

FIG. 8 shows tube links 40 with S-shaped cross-section. Locking-and-closing elements 41 are of U-shaped radial cross-section in the part which is open toward the outside of the tube. This is followed on one side by projecting flap 42 which overlaps the part of the tube link 40 which is open toward the inside of the tube. The U-shaped cross-section and the projecting flap of locking-and-closing element 41 is welded to tube link 40 at 43 and 44. Thus two locking-and-closing elements are virtually combined in this case into a single component.

Figure 9:
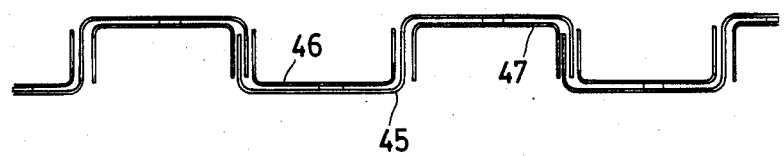

According to FIG. 9, the tube-links 45 with S-shaped cross-section are designed in such a way that U-shaped locking-and-closing elements 46, 47 are inserted internally and externally in the configuration. By providing a greater number of radial ridges, this version creates a link-tube of particularly good lateral stiffness.

Figure 10:
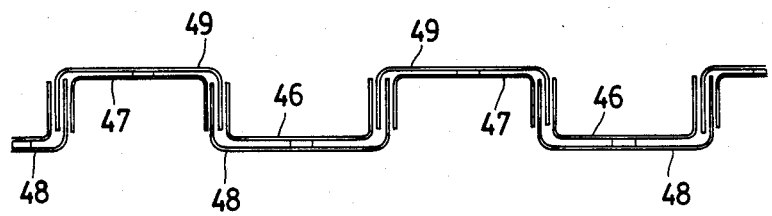

FIG. 10 shows the same construction as FIG. 9, but with the difference that here the tube link consists of ring-shaped links 48, 49 with U-shaped cross-section.

This example also serves as a simple explanation that it is enough when only every second locking-and-closing element has a blocking function in longitudinal direction of the tube. For example, when locking-and-closing elements 46 are designed as shown, locking-and-closing elements 47 can be considerably narrower straps having only the function to close links 49, without permitting adjoining links 48, 49 to move in the longitudinal direction of the tube.

A tube design according to FIG. 10 also permits designing of the internal rings 48 as self-supporting, i.e. undivided rings, so that the locking-and-closing elements 46 can be eliminated. Only locking-and-closing elements 47 are required to perform a closing and locking function.

Figure 11:
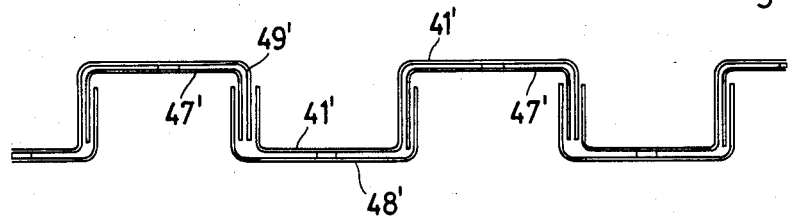
Figure 12:
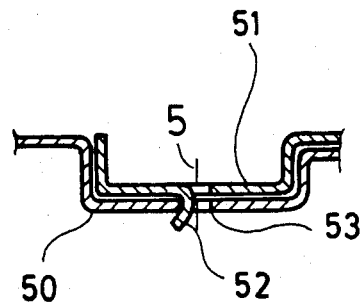

FIG. 11 shows the combination of a link-tube according to FIG. 10 with locking-and-closing elements 41' according to FIG. 8, in which similar elements are designated by the same reference numerals with prime notations. FIG. 12 shows an axial section of tube link 50 with locking-and-closing element 51. From locking-and-closing element 51, lugs 52 are stamped out and guided by bending through openings 53 of tube-link 50 to hold same together in the area of the joint or separating line 5 (FIGS. 1 and 2).

Figure 13:
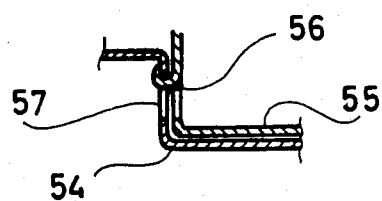

FIG. 13 shows another embodiment with tube-link 54 and locking-and-closing element 55 with U-shaped cross-section. In this case, a lug 56 has been stamped out from the legs of the U and guided through opening 57 of the adjoining radial ridge of link 54.

Figure 14:
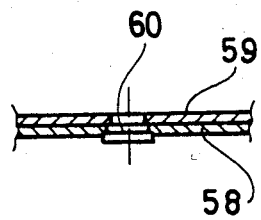

Another version is shown in FIG. 14, which is a partial view of tube-link 58 and a locking-and-closing element 59. Both parts are positively connected by means of a stamped deformation at 60.

Figure 15:
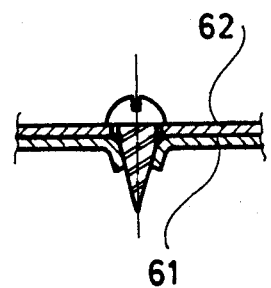

In a similar fashion, FIG. 15 shows a screw connection between tube-link 61 and locking-and-closing element 62.

Figure 16:
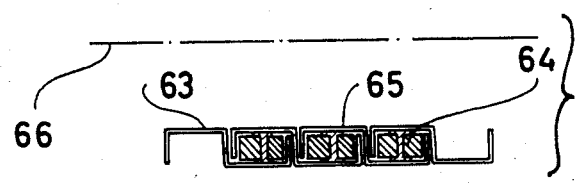
FIG. 16 shows a partial lateral section of another embodiment of a link-tube.

FIG. 16 shows a partial sectional view of a tube having S-shaped links 63. When the tube is in buckled position, the links 63 of the tube are connected with each other by means of locking-and-closing elements 64, in this particular case for example by means of rivets 65. The tube axis 66 lies in the position shown in FIG. 16. The locking-and-closing elements are arranged on the inside of a theoretical tube bend.

I claim:

1. Flexible hose, particularly to carry cables, tubes and the like for placement between a fixed first terminal end and a movable second terminal end, having a plurality of essentially ring-shaped links (2,11,15,21,25,35,36,40,45,48,49,50,54,58,61,63) which have, in radial cross-section, interlocking, interengaging essentially rectangular shape defining rectangular sides, and which are formed with marginal radial ribs interlocking with each other; and connection means for connecting said links together and shaped to permit bending of the hose from a straight-in-line position of the respective links only in one direction, which direction is perpendicular to one of the rectangular sides of the cross-section of the hose, wherein, in accordance with the invention, the links (2,11,15,21,25,35,36,40,45,48,49,50,54,58,61,63) are formed with a separating line or joint at one of the sides subject to bending;

locking-and-closing elements (6,7,12,13,16,17,20,23,27,37,38,41,46,47,51,55,59,6-2,64) are provided connecting the respective links and locking and closing the separating line or joint; and wherein at least every second locking-and-closing element has a width dimension which prevents mutual movement of links which are adjacent each other, when in longitudinal direction of the hose, the hose is deformed from a straight line position upon extending or upon buckling of the hose, said locking and closing elements forming a locking, closing and separating element for said adjacent links.

2. The hose of claim 1, wherein the ribs include marginal zones, and said marginal zones of the ribs have S-shape.

3. The hose of claim 1, wherein the ribs include marginal zones, and said marginal zones of the ribs have U-shape.

4. The hose of claim 1, wherein the locking-and-closing elements overlap regions of the links, and, in said region of overlap, the locking-and-closing elements and the links are connected by at least one of: interengagement fit; material engagement.

5. The hose of claim 1, wherein the locking-and-closing elements overlap regions of the links, and, in said region of overlap, the locking-and-closing elements and the links are connected by material engagement comprising at least one of: welding, soldering, adhesion, plastic injection, foam connection, screw connection, rivet connection.

6. The hose of claim 1, wherein the locking-and-closing elements overlap regions of the links, and in said region of overlap, the locking-and-closing elements and the link are connected by an interengaging fit comprising a projection-and-recess engagement.

7. The hose of claim 1, wherein the locking-and-closing elements (7, 13, 17, 20, 64) comprise connecting straps.

8. The hose of claim 1, wherein the locking-and-closing elements comprise straps which, in radial cross-section, are generally U-shaped.

9. The hose of claim 7, wherein upon bending of the hose about a bending radius, the locking-and-closing elements fill a space formed by links.

10. The hose of claim 1, wherein the locking-and-closing elements are formed with a projecting flap (42) axially overlapping at least a portion of the interengaging fit of the links.

11. The hose of claim 1, wherein the locking-and-closing elements extend essentially over at least one entire rectangular side of the links and over the separating line or joint (5).

12. The hose of claim 1, further including further locking elements located radially opposite the respective locking-and-closure elements (12).

13. The hose of claim 1, wherein the locking-and-closing elements are formed as rings surrounding the hose.

14. The hose of claim 1, wherein
the links (35,36,48,49) have terminal ends which are essentially U-shaped;
alternate links (36,48) are located radially inwardly of adjacent links; and
wherein the radially inwardly positioned links (36,48) are formed as continuous, closed ring-shaped links, with the marginal ends open and extending, as open terminal ends, radially outwardly.

15. The hose of claim 1, wherein
alternate links (63) are located radially outwardly of adjacent links;
the locking-and-closing elements (64) are connection with at least the radially outwardly positioned links (63), and
wherein the radial direction is measured with respect to a hose bent over a curvature having a radius defining said radially outward position.

* * * * *

UNITED STATES PATENT AND TRADEMARK OFFICE
CERTIFICATE OF CORRECTION

PATENT NO. :  4,727,908

DATED     :  March 1, 1988

INVENTOR(S) :  Walter FORSTER

It is certified that error appears in the above-identified patent and that said Letters Patent is hereby corrected as shown below:   On The Title Page:

Page 1, in the listing of Number [56], "References Cited", U.S. PATENT DOCUMENTS:  please correct Patent 4,171,236. It should read:

>4,111,236  9/1978  Moritz

Signed and Sealed this

Eighteenth Day of October, 1988

Attest:

DONALD J. QUIGG

Attesting Officer

Commissioner of Patents and Trademarks